United States Patent
Gentner et al.

[11] Patent Number: 5,964,475
[45] Date of Patent: Oct. 12, 1999

[54] TRAILER COUPLING

[75] Inventors: Wolfgang Gentner, Ditzingen; Emmerich Kleb, Markgroeningen; Joerg Riehle, Stuttgart; Hans Riehle, Ludwigsburg, all of Germany

[73] Assignee: ORIS Fahrzeugteile Hans Riehle GmbH, Moeglingen, Germany

[21] Appl. No.: 08/977,718

[22] Filed: Nov. 25, 1997

Related U.S. Application Data

[63] Continuation of application No. PCT/EP97/01503, Mar. 25, 1997.

[30] Foreign Application Priority Data

Apr. 1, 1996 [DE] Germany .................... 196 12 962

[51] Int. Cl.⁶ .................................................. B60D 1/62
[52] U.S. Cl. ................................. 280/420; 280/491.3
[58] Field of Search ............................ 280/491.3, 489, 280/490.1, 491.1, 491.4, 495, 498, 504, 511

[56] References Cited

U.S. PATENT DOCUMENTS 4,078,827  3/1978  Pilhall ........................... 280/491.3
4,283,072  8/1981  Deloach, Jr. ................... 280/511 X

FOREIGN PATENT DOCUMENTS

| | | |
|---|---|---|
| 2 450 167 | 9/1980 | France . |
| 2 659 278 | 9/1991 | France . |
| 2 138 154 | 2/1973 | Germany . |
| 38 33 471 | 1/1990 | Germany ................... 280/504 |
| 41 42 317 | 6/1993 | Germany ................... 280/504 |
| 9115374 | 10/1991 | WIPO ...................... 280/491.3 |

*Primary Examiner*—Robert J. Oberleitner
*Assistant Examiner*—Daniel Yeagley
*Attorney, Agent, or Firm*—Barry R. Lipsitz; Ralph F. Hoppin

[57] ABSTRACT

In order to provide a trailer coupling for motor vehicles, in particular passenger vehicles, comprising a coupling ball, a coupling neck, the one end region of which is angled and bears the coupling ball, and a contact unit for providing a connection between a vehicle electrical system and a trailer electrical system, which is more easily accessible it is suggested that the contact unit be held on a pivoting arm, that the pivoting arm be mounted on a pivot bearing stationary with respect to the vehicle so as to be pivotable about a pivot axis and that the contact unit be movable with the pivoting arm from an operative position into a rest position and vice versa as a result of a pivoting movement about the pivot axis.

18 Claims, 4 Drawing Sheets

TRAILER COUPLING

This application is a continuation of International PCT Application No. PCT/EP97/01503 filed on Mar. 25, 1997.

BACKGROUND OF THE INVENTION

The invention relates to a trailer coupling for motor vehicles, in particular passenger vehicles, comprising a coupling ball, a ball neck, the one end region of which is angled and bears the coupling ball, and a contact unit for providing a connection between a vehicle electrical system and a trailer electrical system.

Trailer couplings of this type are known from the state of the art. The disadvantage of such trailer couplings is to be seen in the fact that the contact unit is generally difficult to access, in particular in the case of detachable trailer couplings.

SUMMARY OF THE INVENTION

The object underlying the invention is therefore to create a trailer coupling with a contact unit which is more easily accessible.

This object is accomplished in accordance with the invention, in a trailer coupling of the type described at the outset, in that the contact unit is held on a pivoting arm, that the pivoting arm is mounted on a pivot bearing stationary with respect to the vehicle so as to be pivotable about a pivot axis and that the contact unit is moveable with the pivoting arm from an operative position into a rest position and vice versa as a result of a pivoting movement about the pivot axis.

The advantage of the inventive solution is to be seen in the fact that as a result of the arrangement of the contact unit on a pivoting arm the possibility is created of, on the one hand, pivoting the contact unit into an operative position, in which it is easily accessible, and, on the other hand, pivoting the contact unit into the rest position when no contact is intended to be provided between the vehicle electrical system and the trailer electrical system.

In this respect it is particularly advantageous when the contact unit in the rest position is in a position not encroaching on the ground clearance of the motor vehicle.

It is thus ensured that the contact unit in the rest position does not cause any interference of the use of the vehicle as a result of negatively encroaching on the ground clearance thereof.

The inventive solution is of an advantageous design when the contact unit in the operative position is located essentially on a side of the rear fender (e.g. bumper) facing away from the vehicle body and is thus arranged in an area accessible to a user in an optimum manner.

The contact unit is accessible in a particularly favorable manner when this is arranged in the operative position so as to be higher than a lower edge of the fender so that—in contrast to the solutions known so far—the provision of a contact between the vehicle electrical system and the trailer electrical system does not make it necessary to connect the contact unit on the vehicle side to a contact unit on the trailer side beneath the fender.

Furthermore, it has proven to be advantageous in one embodiment when the contact unit in the operative position is arranged lower than the coupling ball since it is thus ensured that a trailer element engaging over the coupling ball cannot collide with the contact unit during travel.

A particularly advantageous solution provides for the contact unit in the rest position to be arranged on a side of the rear fender facing the vehicle body. In this position it is possible to remove the contact unit out of the region visible to a user of the vehicle and preferably arrange it without any negative encroachment on the ground clearance of the vehicle.

In this respect it is particularly expedient when the contact unit in the rest position is arranged in a rest position space which is located between the rear fender and the vehicle body. In this case, a particularly simple arrangement of the contact unit which is invisible to a great extent is possible.

In this respect it is particularly expedient when the rest position space is located essentially above a ground-side surface defined by an underbody structure and the rear fender of the motor vehicle. This means that, on the one hand, an adequate ground clearance is ensured and, on the other hand, it is ensured that the contact unit is not arranged in the region visible to the user of the vehicle.

With respect to the pivot bearing, no further details have been given in conjunction with the embodiments described thus far. One advantageous embodiment, for example, provides for the pivot bearing to be held on a base part bearing the ball neck so that the pivot bearing for the pivoting arm for the contact unit and the ball neck are seated on the same base part and thus can be assembled together in a particularly simple manner.

With respect to the pivot axis, no further details have likewise been given in conjunction with the preceding description of the individual embodiments. In principle, any suitable position of the pivot axis would be conceivable, for example a pivot axis extending approximately parallel to the transverse direction of the vehicle.

One advantageous embodiment provides for the pivot axis to extend at an angle to a vertical longitudinal plane parallel to the longitudinal direction of the vehicle. With such an angled position it is possible to move the contact unit back and forth between the rest position and the operative position as a result of pivoting the contact unit about a single axis.

A particularly advantageous realization of the inventive solution provides for the projection of the pivot axis onto a vertical longitudinal plane parallel to the longitudinal direction of the vehicle to be inclined in relation to the horizontal through an angle which is in an angular range of approximately 0° to approximately 60°.

Ball neck and coupling ball can be positioned in the rest position even better when the angular range is up to 50° at the most.

The ground clearance during pivoting may be improved when the angular range begins at at least 15°, even better at at least 30°.

In addition, it is expedient in the case of an inventive solution when the projection of the pivot axis onto a horizontal plane extends through an angle inclined in relation to the longitudinal direction of the vehicle which is in an angular range of approximately 20° to approximately 70°.

It is particularly advantageous when the angular range is between approximately 30° and approximately 65°, even better between approximately 40° and approximately 60°.

It is advantageously provided for the projection of the pivot axis onto a vertical transverse plane extending at right angles to the longitudinal direction of the vehicle to be inclined in relation to the horizontal through an angle which is in an angular range of approximately 0° to approximately 60°.

These advantageous embodiments of a realization of a pivoting movement for the contact unit do not, however, exclude other types of realization. It is, for example, likewise possible to pivot the contact unit likewise from the rest position into the operative position—where necessary under special, constructional, marginal conditions—about an axis extending transversely to the longitudinal axis of the vehicle.

In principle, it is provided in the inventive solution for the contact unit to be provided with a pivoting arm provided for this. For example, it is conceivable to provide the contact unit located in operative position and having its own pivoting arm next to the ball neck with the coupling ball and, on the other hand, to provide for this to then be pivotable about the pivoting axis into the rest position out of the location suitable for an optimum access but inconvenient when the ball neck has been removed or moved into a rest position.

A particularly advantageous embodiment of the inventive solution provides for the ball neck to also be made pivotable about an axis and for ball neck and contact unit to be pivoted together.

The simplest embodiment of such a solution provides for the ball neck to also represent the pivoting arm for the contact unit, i.e., for the contact unit to be arranged directly on the ball neck itself.

Particularly when a conventional contact unit is provided in the form of a socket, a housing of the contact unit is preferably arranged directly on the ball neck next to the coupling ball.

It is particularly expedient when the housing of the contact unit is arranged on the ball neck between the coupling ball and the rear fender.

The housing can thereby be a housing placed on the ball neck.

It is, for example, even possible, in order to improve the accessibility even further, for the housing to be pivotable relative to the ball neck, preferably in a limited manner, in order to make this accessible in a particularly simple manner.

Another, expedient solution provides for the housing of the contact unit to be integrally formed on the ball neck, for example to be an integral component of the ball neck itself. In this case, it is, for example, possible for the housing for the contact unit to be present in an integrally formed manner next to the ball neck in the shape previously known.

Another solution provides for a section of the ball neck to be shaped as a housing for the contact unit.

In the cases, in which the housing for the contact unit is an integral component of the ball neck, it is, for example, provided for the ball neck to be designed as a casting.

In a further embodiment, it is advantageously provided for the angled end region of the ball neck and the housing of the contact unit in the rest position to be located on a side remote from the road surface of a horizontal plane extending at the level of a lowest point of the coupling ball located in rest position and for the horizontal plane to be located at least at the level of the lowest point of the ball neck located in operative position. It is ensured with this definition of the rest position that the coupling ball defines the lowest point of the unit consisting of ball neck and coupling ball and the ball neck extends with the angled end and the housing of the contact unit at the most as far as this point but is preferably located at a higher level for reasons of a space-saving arrangement.

It is even more advantageous when the entire ball neck with the housing of the contact unit is, in particular with the bearing element, located in the rest position on a side remote from the road surface of a horizontal plane extending at the level of the lowest point of the coupling ball located in rest position so that the entire ball neck extends at the most as far as this plane, preferably on the side of this plane remote from the road surface.

In the case of a trailer coupling, with which the ball neck forms the pivoting arm for the contact unit, it is preferably provided for a projection of a coupling ball central axis onto the vertical longitudinal plane to undergo a rotation through an angle of at least 80° during pivoting of the ball neck about the pivot axis from the operative position into the rest position and for a lowest point of ball neck with contact unit and coupling ball in the rest position to be located at least at the level of a lowest point of the ball neck in operative position.

In the case of such a rotation of the projection of the coupling ball central axis onto the longitudinal plane, a corresponding rotation of the ball neck with contact unit takes place at the same time and so the ball neck with contact unit is inclined as a result of the pivoting movement about the pivot axis to such an extent that it is located with its lowest point at least at exactly the same level above the road surface as in operative position and thus the unit consisting of ball neck, contact unit and coupling ball does not affect the ground clearance in the rest position.

It is particularly advantageous when the projection of the coupling ball central axis onto the vertical longitudinal plane undergoes a rotation of more than 90°, even better of more than 100° and most preferably of more than 120°, during pivoting about the pivot axis. Particularly during a pivoting of the coupling ball central axis through more than 90°, preferably more than 120°, the space required by ball neck with contact unit and coupling ball in the rest position may be kept particularly small.

The rotation of the projection of the coupling ball central axis onto the longitudinal plane amounts to 210° at the most, even better 180° at the most, preferably 160° at the most.

The projection of the coupling ball central axis onto the vertical longitudinal plane preferably forms with the horizontal an angle in the range of approximately 30° to approximately 150°, even better in the range of approximately 40° to approximately 140°, so that a rest position space is obtained which is designed to be short in the longitudinal direction of the vehicle.

It is possible with the inventive teaching to move the unit consisting of ball neck, contact unit and coupling ball beneath the fender of the motor vehicle into a rest position which is covered from sight by the fender and thus located above a 15° line of sight and also does not affect the ground clearance negatively.

A particularly advantageous solution is possible when the projection of the coupling ball central axis onto the vertical longitudinal plane in the rest position extends at an angle of at least 170° in relation to a horizontal line. It is even better when the projection of the coupling ball central axis onto a vertical longitudinal plane in the rest position extends at an angle of more than 180°, even better of more than 210°, in relation to a horizontal line.

This ensures that the unit consisting of ball neck and coupling ball is turned in the rest position to such an extent that it can be moved out of the visible region in a simple manner.

An additional, advantageous solution may be realized when the coupling ball in the rest position is arranged at a distance from a road surface which is equal to or smaller than a distance of the angled end region from the road surface and when a lowest point of ball neck with contact unit and coupling ball in the rest position is located at least at the level of a lowest point of the ball neck in operative position. This definition also determines a condition which enables the unit consisting of ball neck with contact unit and coupling ball to be positioned above the road surface at an adequate height.

It may be ensured in a particularly simple manner that ball neck and coupling ball are removed in the rest position sufficiently far out of the line of sight when the ball neck with contact unit and the coupling ball in the rest position are located on a side remote from the road surface of a horizontal plane defined by a lower edge of the pivot bearing.

An inventive solution is particularly advantageous when the pivot bearing is arranged in relation to the plane of curvature to be offset unsymmetrically in the direction of a side opposite the rest position of a plane of curvature of the ball neck.

The offset can, for example, be so slight that the pivot bearing is merely located unsymmetrically to the plane of curvature of the ball neck but is still intersected by the plane of curvature.

The offset can, however, also be so great that the pivot bearing or at least the pivot member is located laterally next to the plane of curvature of the ball neck.

The contact unit is preferably a conventional plug-in unit. In another example, the contact unit is preferably integrated into the coupling ball and thus pivotable in a particularly expedient manner together with the coupling ball so that, particularly with this solution, the integration of the pivoting arm with the contact unit in ball neck and coupling ball presents itself.

In conjunction with the preceding explanations of the individual embodiments, no details have been given as to how the pivoting movement is intended to be brought about. For example, it would be possible to carry out the pivoting movement as a result of direct action on the ball neck by hand or by means of a drive actuated by hand, for example, with a crank handle.

The inventive solution is, however, particularly advantageous when an electric drive having a motor, preferably having an electromotor, is provided for carrying out the pivoting movement about the pivot axis so that an automatic pivoting of ball neck with contact unit and coupling ball between the operative position and the rest position can be carried out with the motor.

With respect to the action of the drive on the bearing element for carrying out the pivoting movement, all possible solutions for an intermediate gearing are conceivable. It is, however, particularly advantageous when the drive acts on the bearing element via a self-locking gearing since, in this case, the self-locking gearing can already be used to fix the ball neck with the coupling ball in the rest position and/or in the operative position. Moreover, no forces acting on the coupling ball retroact as torque on the motor of the drive and so the motor need merely be designed such that it is in a position to pivot coupling ball and ball neck between the operative position and the rest position without any force acting on them.

In order to clearly define the operative position and/or the rest position, it is preferably provided for the pivoting movement of the ball neck to be limited by a stop stationary with respect to the vehicle. This is preferably a stop which acts on the bearing element.

In the simplest case, it is provided in such a solution for the bearing element to have a projection which acts on the stop stationary with respect to the vehicle at least in the rest position or the stop position.

In this case, the operative position is preferably determined by the projection acting against a stop stationary with respect to the vehicle while the rest position of the ball neck can, for example, also be determined by the ball neck itself coming to rest on a stop surface stationary with respect to the vehicle with any region of it in the rest position.

As already explained in the above, it is already ensured by means of a self-locking gearing that the ball neck with the coupling ball will remain in the operative position, even when the customary traction and braking forces act on the coupling ball, for example, as a result of a trailer.

In order, however, to offer a maximum in safety, it is provided in addition or alternatively to a self-locking gearing for the ball neck to be fixable in the operative position by means of a locking device. As a result of such a locking device, it is possible to fix the ball neck in the operative position in a reliable manner in the same way as with the couplings previously known, which can be removed and attached manually.

The locking device is preferably designed such that it transfers automatically into a locking position when the operative position of the ball neck is reached and thus fixes the ball neck in the operative position. This ensures that—particularly when the inventive solution is operated by means of an electric drive—the ball neck is locked automatically in the operative position when reaching this operative position.

With a locking device of this type, it is expediently provided for this to be actuatable via a release device for releasing the locking position.

The release device can be actuated in the most varied of ways. In the simplest case, it would be conceivable to provide a manual release device. It is, however, particularly advantageous, especially in conjunction with a drive having a motor, when the release device can be actuated by means of a release drive. Such a release drive could, for example, be a magnet actuating the release device.

A particularly expedient solution, particularly with respect to the simplicity and inexpensiveness of the construction, provides for the release device to be actuatable by the drive for pivoting the ball neck, i.e. the drive motor, with which the ball neck can be pivoted, is used, for example, at the same time to actuate the release device.

With respect to the fixing of the pivot bearing in position on the vehicle, the most varied of solutions are conceivable. For example, it would be conceivable to fix the pivot bearing in position on the fender unit of the motor vehicle.

A solution which can be installed particularly advantageously provides for the pivot bearing to be held on a transverse support member extending transversely to the longitudinal direction of the vehicle approximately in the same orientation as the rear fender. A transverse support member of this type creates the possibility of creating a fixing in position independent of the fender unit when equipping the vehicles.

It is particularly advantageous when the transverse support member is arranged between two side supports forming additional parts and connected to them and when the side supports extend to supporting points on the side of the vehicle. Three structural units are thus provided for fixing the pivot bearing in position on the vehicle, wherein the transverse support member and the side supports can be preassembled so that the entire unit consisting of transverse support member and side supports can be mounted on supporting points on the side of the vehicle.

The subdivision of the fixing of the pivot bearing into a transverse support member and two lateral side supports allows an adaptation to the most varied of vehicle types to be carried out in a simple manner and such that the transverse support member which supports the pivot bearing always represents the same unit in the case of different types of vehicle while the adaptation to the different types of vehicle can be realized via the side supports which then have to be adapted to the supporting points available in the different types of vehicle.

A particularly favorable adaptation to the most varied of vehicle types is possible when the transverse support member can be attached to the side supports via a connection adapted to be fixed in various rotary positions in relation to a transverse axis extending transversely to the longitudinal direction of the vehicle. On the one hand, this allows a rigid connection to be provided between the transverse support member and the side supports during the production thereof and, on the other hand, an additional degree of freedom to be available in the adaptation of the unit consisting of transverse support member and side supports to individual types of vehicle, namely in that the transverse support member can be mounted in different rotary positions relative to the side supports.

Additional features and advantages of the inventive solution are the subject matter of the following description as well as the drawings illustrating one embodiment.

DETAILED DESCRIPTION OF THE INVENTION

Figure 1:
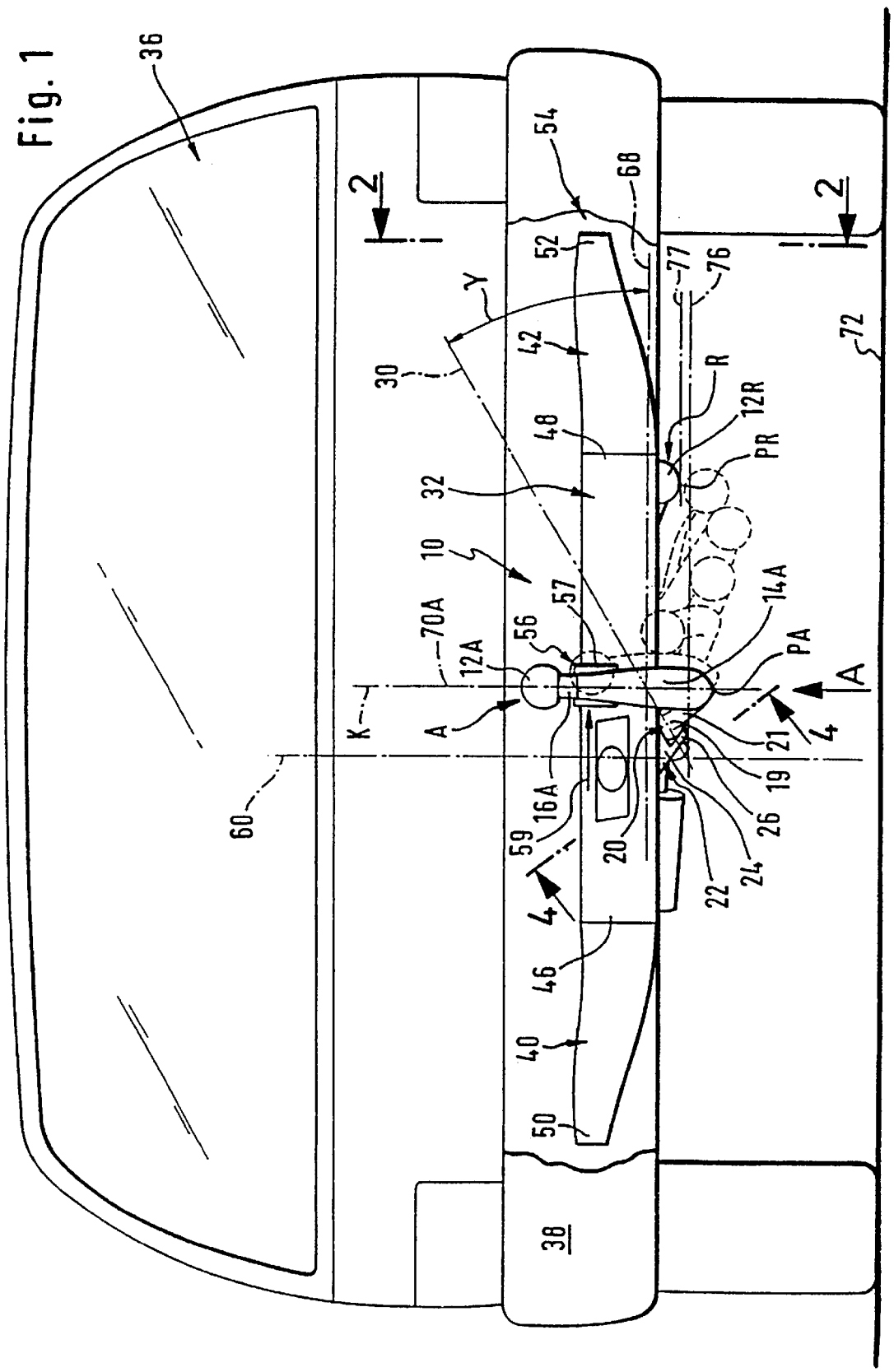
FIG. 1 shows a plan view of a vehicle with an inventive trailer coupling from behind with a fender unit partially broken away, wherein the plane of projection represents a vertical transverse plane extending at right angles to the longitudinal direction of the vehicle.
Figure 2:
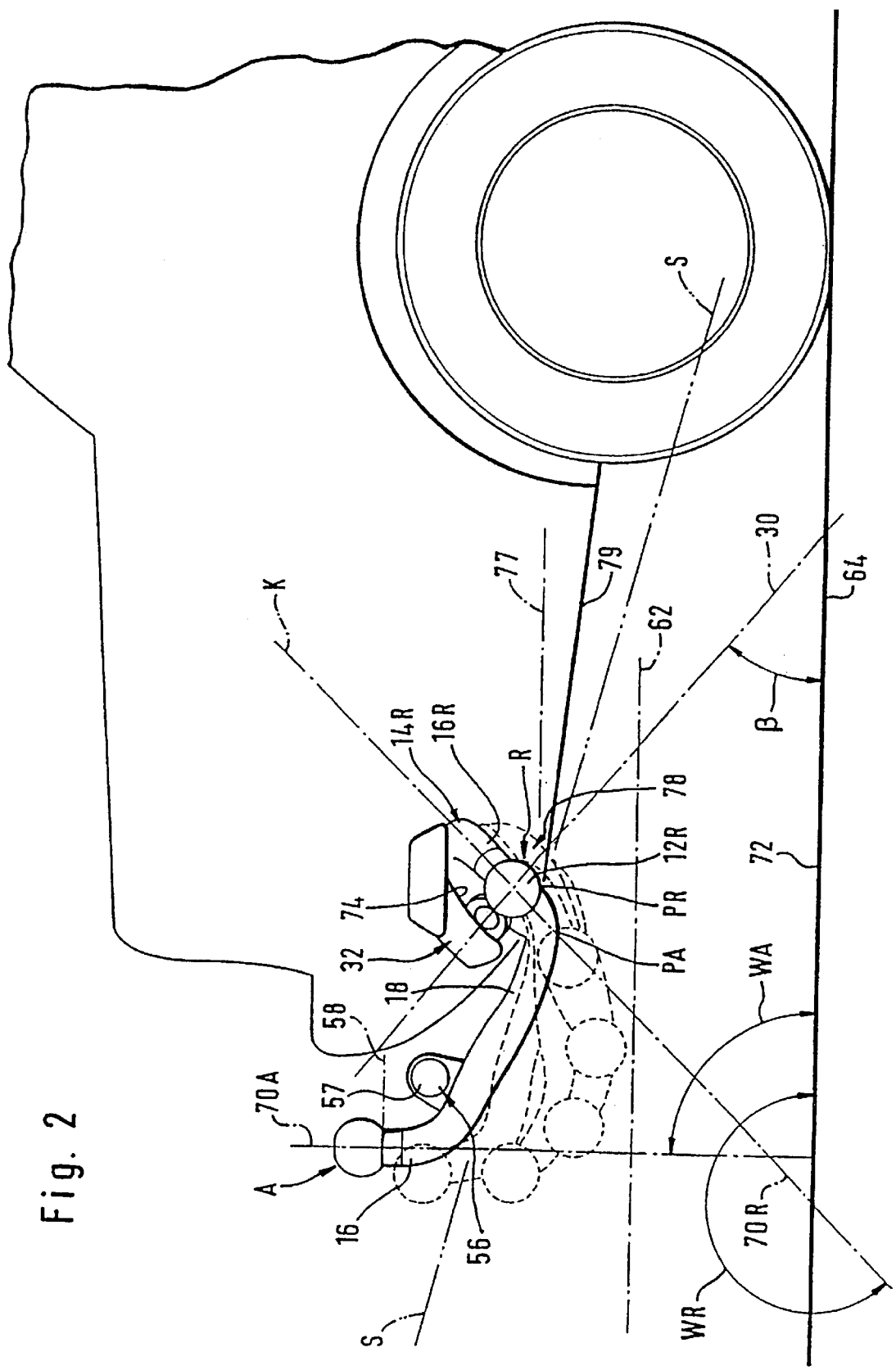
FIG. 2 shows a section through a rear part of the vehicle in the region of the inventive coupling along line 2—2 in FIG. 1, wherein the plane of projection is a vertical longitudinal plane extending parallel to the longitudinal direction of the vehicle.
Figure 3:
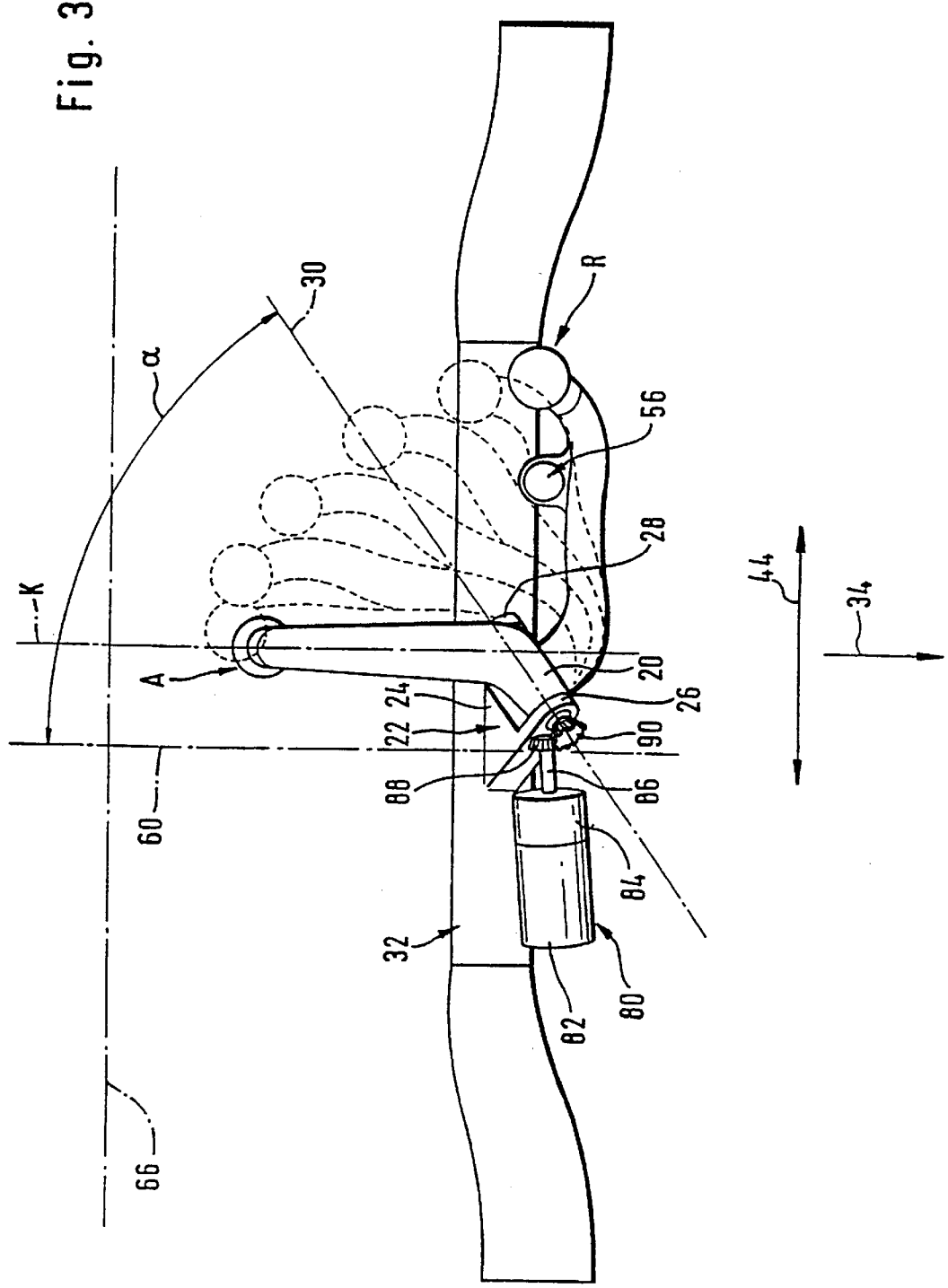
FIG. 3 shows a plan view of the inventive coupling in the direction of arrow A in FIG. 1, wherein the plane of projection is a horizontal plane.

One embodiment of an inventive trailer coupling which is illustrated in FIGS. 1 to 3 and designated as a whole as 10 comprises a coupling ball 12 which is supported by a ball neck 14, wherein the ball neck 14 has an angled end region 16, on which the coupling ball 12 is directly seated, and a lower end region 18 which is located opposite this angled end region 16 and connected to a bearing element 20, wherein this bearing element 20 can be pivoted about a pivot axis 30 in a pivot bearing 22, for example comprising a bearing member 24 with two bearing flanges 26 and 28.

The bearing element 20 preferably comprises a pivoting member 19 located in the pivot bearing 22, for example, between the bearing flanges 26 and 28 and an arm 21 extending from the pivoting member 19 to the end region 18 of the ball neck 14, wherein the arm extends at an angle to the plane of curvature K in operative position A of the ball neck 14A, namely in a direction opposite to the rest position R of the ball neck, so that the pivoting member 19 is essentially located to the side of the plane of curvature K.

The pivot bearing 22 is, for its part, held on a transverse support member which is designated as a whole as 32 and extends transversely to a longitudinal direction 34 of a motor vehicle designated as a whole as 36 and along a rear fender (e.g. bumper) unit 38 thereof.

The transverse support member 32 is preferably seated between two side supports 40 and 42 which adjoin ends 46 and 48 of the transverse support member 32, which are located opposite one another in a transverse direction 44 of the vehicle extending at right angles to the longitudinal direction 34 of the vehicle, and extend as far as lateral attachment regions 50, 52 on a vehicle body 54.

The inventive trailer coupling is connected to the vehicle body 54 in the attachment regions 50 and 52.

A socket (e.g., contact) 56 with electrical connections for the electrical supply to a trailer is seated on the ball neck 14.

The socket 56 comprises a socket housing 57 which has transversely to the plane of curvature K of the ball neck an extension which corresponds approximately to that of the coupling ball 12.

In addition, the housing has in the direction of the plane of curvature K an extension which reaches at the most as far as a plane 58 extending at right angles to the coupling ball central axis 70 at the level of the coupling ball attachment in order to ensure that a part of the trailer coupling engaging over the coupling ball does not collide with the socket housing 57.

In the simplest case, the socket 56 is constructed such that a plug on the trailer side can be inserted in a plug-in direction 59 extending transversely or at an angle to the plane of curvature.

In the simplest case, the socket housing is arranged symmetrically to the plane of curvature K. It is, however, also possible, particularly in order to facilitate the plugging in of the plug on the trailer side, to arrange the housing so as to be inclined in relation to the plane of curvature K.

The pivot axis 30 extends at an angle to a vertical longitudinal plane 60 extending parallel to the longitudinal direction 34 of the vehicle, wherein the projection of the pivot axis 30 onto a horizontal plane 62 forms with the longitudinal plane 60 or the longitudinal direction 34 of the vehicle an angle α which is, for example, in the range between approximately 50° and approximately 60°, preferably at approximately 55°.

In addition, the projection of the pivot axis 30 onto the longitudinal plane 60—as illustrated in FIG. 2—forms with a horizontal line 64 extending in the longitudinal plane 60 an angle β which is, for example, in the range of approximately 35° to approximately 45°, preferably at approximately 40°.

Furthermore, the projection of the pivot axis 30 onto a vertical transverse plane 66 parallel to the transverse direction 44 of the vehicle and at right angles to the longitudinal plane 60—as illustrated in FIG. 1—forms with a horizontal line 68 extending in this plane an angle γ which is, for example, in the range of approximately 25° to approximately 35°, preferably at approximately 30°.

The ball neck 14 is pivotable about the pivot axis 30 from an operative position A, in which a coupling ball central axis 70 extends approximately at right angles onto the horizontal plane 62 and the ball neck 14, as illustrated in FIGS. 1 and 3, extends in a plane of curvature K extending to the longitudinal plane 60 and through the coupling ball central axis 70 in a curved manner as far as the bearing element 20, into the rest position R.

In the rest position R, the coupling ball central axis 70R extends at an angle to the horizontal plane 62, wherein, proceeding from the coupling ball 12R located in rest position, the angled end region 16R of the ball neck 14R adjoining this extends from a side of the coupling ball 12R facing away from a road surface 72. This means, in other words, that the coupling ball 12A in the operative position A points upwards away from the road surface 72 and the ball neck 14 extends downwards in the direction of the road surface 72 proceeding from the coupling ball 12A while, in the rest position R, the coupling ball 12R points towards the road surface 72 while the ball neck 14R extends upwards proceeding from the coupling ball 12R, i.e. away from the road surface 72 in an arc as far as the pivot bearing 22.

In the rest position R, in particular, the ball neck 14R extends along the transverse support member 32, preferably as close as possible to an underside 74 thereof facing the road surface 72 in order to obtain as small a rest position space 78 as possible for accommodating the ball neck 14R of the coupling ball 12R in the rest position R. In this respect, the socket 56 with the socket housing points approximately in the same direction as the coupling ball 12 and may be arranged in the rest position space in the same manner as the coupling ball, wherein the fact that the socket housing 57 has approximately the same extension as ball neck 14 and coupling ball 12 transversely to the plane of curvature K also makes the accommodation of the socket housing 57 possible without any additional space requirement in the rest position space 78.

Furthermore, in the rest position R the ball neck 14R with the coupling ball 12R is arranged essentially above a line of sight S, which is tangent to the underbody structure of the vehicle body or the fender unit 38, extends in the longitudinal plane 60 and is inclined 15° in relation to the road surface 72, in order to position the ball neck 14R with the coupling ball 12R to be essentially invisible for a bystander.

To illustrate the pivoting movement of the ball neck 14 with the coupling ball 12 from the operative position A into the rest position R, the operative position A and the rest position R thereof are shown in FIGS. 1 to 3 by solid lines whereas intermediate positions between the two are indicated by dashed lines.

In this respect, it is apparent that on account of the inclined position of the pivot axis 30 the ball neck 14 extending first of all in the operative position A parallel to the longitudinal plane 60 with its plane of curvature K transfers into a position, in which its plane of curvature K extends at an angle and/or transversely to the longitudinal plane 60.

The movement of the ball neck 14 with the coupling ball 12 and, in particular, the pivoting thereof may—as illustrated in FIG. 2—be described particularly simply by the illustration of the projection of the coupling ball central axis 70 onto the vertical longitudinal plane 60 or a plane parallel thereto. In the operative position A, the projection of the coupling ball central axis 70A onto the longitudinal plane 60 forms an angle WA with the horizontal line 64 of approximately 90°. The coupling ball central axis 70 is pivoted during the pivoting of the ball neck 14 with the coupling ball 12 from the operative position A into the rest position R to such an extent that the projection of the coupling ball central axis 70 in the longitudinal plane 60 undergoes a rotation, namely to such an extent that the projection of the coupling ball central axis 70R in rest position in the longitudinal plane 60 forms with the horizontal line 64 an angle WR which is greater than 180°. The angle is preferably more than 225°.

In order to make, in particular, the ball neck 14R and the coupling ball 12R in the rest position R as invisible as possible for an observer of the motor vehicle 36, the coupling ball 12R is located in the rest position R on a side of a horizontal plane 76 facing away from the road surface 72, the height of which above the road surface 72 is defined by a lower edge of the pivot bearing 22, or touches this horizontal plane 76 so that a lowest point PR of the ball neck 14R and coupling ball 12R in rest position—in this case the lowest point PR of the coupling ball 12R in a horizontal plane 77—is higher than the horizontal plane 76 (FIG. 1) and higher than a lowest point PA of the ball neck 12A in operative position A.

The ball neck 14R and the coupling ball 12R are preferably located in the rest position R in a rest position space 78 which is located between the rear fender unit 38 and the vehicle body 54 and extends along the fender unit 38 in the transverse direction 44 of the vehicle.

The rest position space 78 is expediently located above a ground-side surface 79 of the vehicle 36 defined by an underbody structure of the vehicle body and the fender unit 38 (FIG. 2).

For driving the pivoting movement of the ball neck 14 with the coupling ball 12 about the pivot axis 30, a drive is provided which is designated as a whole as 80 and comprises an electric motor 82 as well as, for example, a self-locking or self-blocking gearing 84. A bevel gear 88 is seated on a driven shaft 86 of the gearing 84 and drives a bevel gear 90 which is non-rotatably connected to the bearing element 20 and preferably seated on a side of the bearing element 20 facing the road surface 72.

The self-locking gearing 84 is designed such that it is blocked in relation to torques acting from the direction of the driven shaft 86 and can be driven only via the motor 82. For example, the self-locking gearing 84 is designed as a worm gear.

Figure 4:
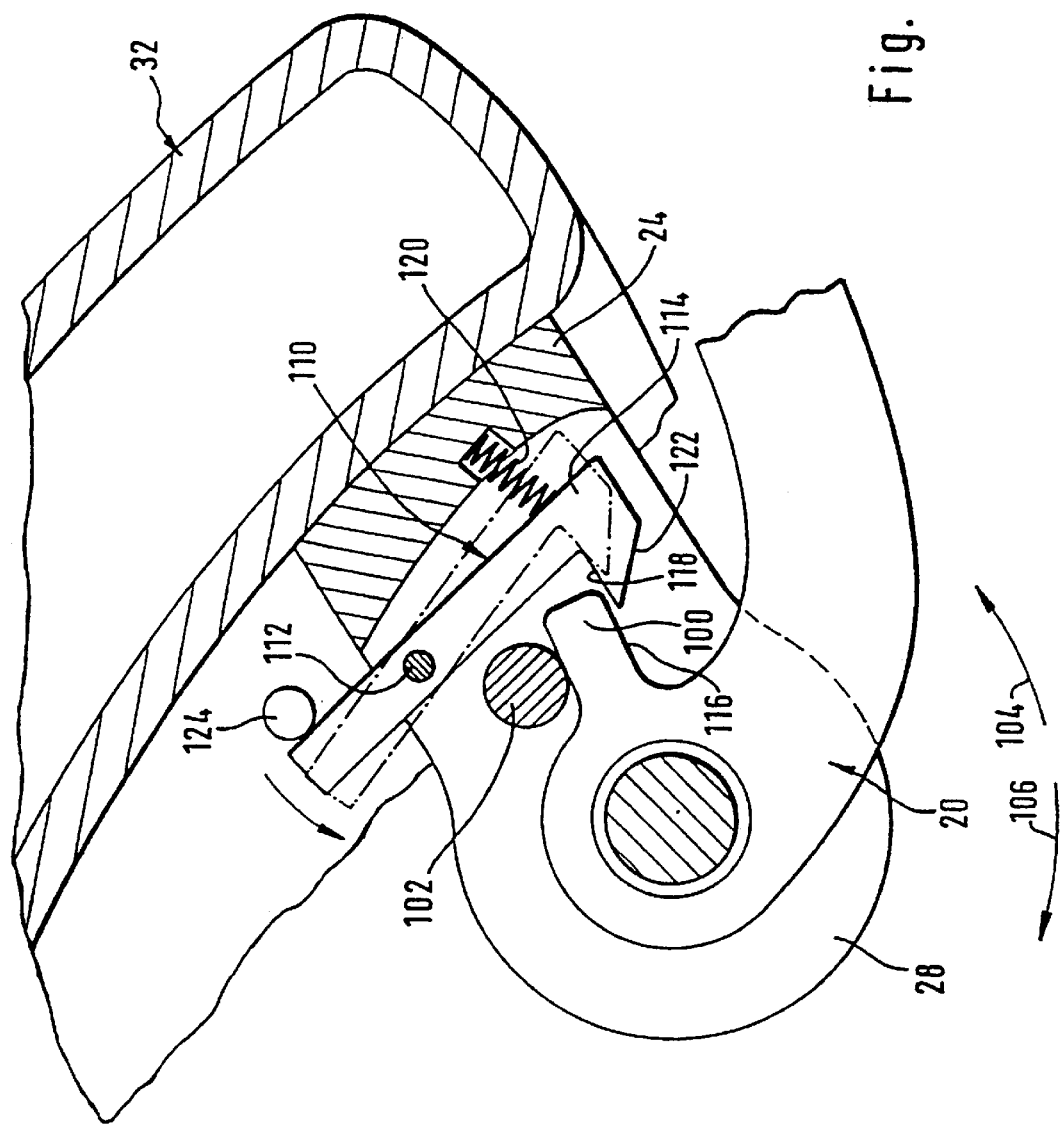
FIG. 4 shows a section along line 4—4 in FIG. 1.

In order to determine the operative position A exactly, the bearing element 20 is, for example, as illustrated in FIG. 4, provided with a nose-like projection 100 which abuts in the operative position on a stop 102 rigidly connected to the transverse support member 32, wherein the stop 102 is, for example, designed as a pin extending between the bearing flanges 26 and 28.

During a pivoting movement in the direction 104 into the operative position A, the projection 100 comes to rest on the stop 102.

If, in the inventive solution, the drive takes place via the self-locking gearing 84 or a worm wheel with a gear wheel which likewise acts as a self-locking gear, it would, in principle, not be necessary to provide an additional safety means during abutment of the projection 100 on the stop 102 since the self-locking gearing 84 counteracts any pivoting movement in the direction of arrow 106 out of the operative position A and does not allow this.

To secure the ball neck 14A in the operative position A without the presence of a self-locking gearing or for additional safety with the presence of a self-locking gearing, a locking device 110 is provided which has, for example, a locking pawl 114 which is mounted for pivoting about an axis 112, in its position locking the ball neck 14A in operative position A, illustrated in FIG. 4 with solid lines, engages behind the projection 100 on a side 116 located opposite the stop 102 and fixes it in position with a locking surface 118 against any movement in pivoting-out direction 106 so that the projection 100 is secured against any pivoting between the locking surface 118 and the stop 102.

In order to hold the locking pawl 114 in its locking position, a spring 120 is, for example, provided which acts on the locking pawl 114 in the direction of its locking position and is supported, for example, on the bearing member 24.

In order to enable the projection 100 to pivot into the position between the stop 102 and the locking surface 118 during movement of the bearing element 20 in pivoting-in direction 104, the locking pawl 114 is provided, in addition, with an inclined run-in surface 122 which extends at an acute angle in relation to the locking surface 118 and faces the projection 100 approaching in pivoting-in direction 104 so that the projection 100 moving in pivoting-in direction 104 and acting on the inclined run-in surface 122 moves the locking pawl 114 out of its locking position contrary to the action of the spring 120 and thus has the possibility of moving beyond the inclined surface 122 into its operative position A, in which it abuts on the stop 102. In this operative position A of the projection 100, the locking pawl 114 again moves in the direction of its locking position, wherein the locking surface 118 engages behind the side 116 of the projection 100 and fixes this in position.

In order to be able to move the projection 100 out of its position locked in operative position A, an actuation of the locking pawl 114 is required which moves this into its unlocking position indicated in FIG. 4 by dash-dot lines. In the simplest case, the actuation of the locking pawl 114 is carried out manually.

This actuation of the locking pawl 114 takes place, when a motor drive 80, is present, preferably via a cam 124 movable by the drive 80, wherein the cam 124 results, for example, by way of a frictionally driven element which, when the drive starts to run, drives the cam 124 ahead of the bearing element 20 so that the locking pawl 114 is already in its unlocking position indicated in FIG. 4 by dash-dot lines before the projection 100 moves away from the stop 102 in pivoting-out direction 106. Such a leading of the drive of the cam 124 can be realized, for example, due to clearance between the element driven by friction and moving the cam 124 and the drive of the bearing element 20, for example via the bevel gear 90 or a gear wheel.

What is claimed is:

1. A trailer coupling for a motor vehicle, comprising:

a coupling ball, and
    a ball neck, one end region thereof bearing the coupling ball, wherein:
        said ball neck is held by a pivot bearing of an element that is stationary with respect to the vehicle, so as to be pivotable about a pivot axis,
        said ball neck is movable from an operative position into a rest position and vice versa as a result of a pivoting movement about the pivot axis,
        a contact unit is provided to effect a connection between an electrical system of the vehicle and a trailer's electrical system, and
        said contact unit is arranged on said ball neck moveable together with said ball neck from said operative position into said rest position, and from said rest position into said operative position.

2. A trailer coupling as defined in claim 1, wherein the contact unit does not encroach on the ground clearance of the motor vehicle when in said rest position.

3. A trailer coupling as defined in claim 1, wherein the contact unit is essentially located at a side of a rear bumper that faces away from a vehicle body of the motor vehicle when in said operative position so as to be accessible to a user.

4. A trailer coupling as defined in claim 3, wherein the contact unit, at its lowest point, is arranged higher than a lower edge of said rear bumper when in the operative position.

5. A trailer coupling as defined in claim 1, wherein the contact unit is arranged lower than the coupling ball when in said operative position.

6. A trailer coupling as defined in claim 1, wherein the contact unit is arranged at a side of a rear bumper that faces a vehicle body of the motor vehicle when in said rest position.

7. A trailer coupling as defined in claim 1, wherein the contact unit is arranged in a rest position space located between a rear bumper and a vehicle body of the motor vehicle when in said rest position.

8. A trailer coupling as defined in claim 7, wherein the rest position space is located essentially above a ground-side surface defined by an underbody structure and the rear bumper of the motor vehicle.

9. A trailer coupling as defined in claim 1, wherein the pivot bearing is held on a base part bearing the ball neck.

10. A trailer coupling as defined in claim 1, wherein the pivot axis extends at an angle to a vertical longitudinal plane parallel to a longitudinal direction of the vehicle.

11. A trailer coupling as defined in claim 10, wherein the angular range is up to 50° at the most.

12. A trailer coupling as defined in claim 10, wherein the angular range begins at at least 15°.

13. A trailer coupling as defined in claim 1, wherein the projection of the pivot axis onto a vertical longitudinal plane parallel to a longitudinal direction of the vehicle is inclined at an angle in relation to the horizontal, said angle being in an angular range of approximately 0° to approximately 60°.

14. A trailer coupling as defined in claim 1, wherein the projection of the pivot axis onto a horizontal plane extends through an angle that is inclined in relation to a longitudinal direction of the vehicle, said angle being in an angular range of approximately 20° to approximately 70°.

15. A trailer coupling as defined in claim 14, wherein the angular range is between approximately 30° and approximately 65°.

16. A trailer coupling as defined in claim 1, wherein the projection of the pivot axis onto a vertical transverse plane extending at right angles to a longitudinal direction of the vehicle is inclined at an angle in relation to the horizontal, said angle being in an angular range of approximately 0° to approximately 60°.

17. A trailer coupling as defined in claim 1, wherein:
    said contact unit comprises a socket for plugging in a plug of the trailer electrical system for providing said connection.

18. An electrical contact unit assembly for providing an electrical connection between an electrical system of a motor vehicle and a trailer's electrical system, comprising:
    a pivoting arm;
    an electrically conductive contact carried by said pivoting arm for providing the electrical connection; and
    a pivot bearing of an element that is stationary with respect to the vehicle; wherein:
        said pivoting arm extends between a pivot axis of said pivot bearing and said electrically conductive contact;

said pivot axis extends at an acute angle to a vertical longitudinal plane that is parallel to a longitudinal direction of the vehicle;

said pivot bearing holds said pivoting arm to enable said pivoting arm to pivot about said pivot axis;

said electrically conductive contact is pivotable with said pivoting arm about said pivot axis from an operative position into a rest position, and vice versa, when in said operative position, said electrically conductive contact is essentially located at a side of a rear bumper that faces away from a vehicle body of the motor vehicle so as to be accessible to a user; and when in the rest position, said pivoting arm and said electrically conductive contact are arranged between the rear bumper and the vehicle body, and substantially the entire pivoting arm is arranged higher than a lower edge of the rear bumper, to maintain a ground clearance of the motor vehicle.

\* \* \* \* \*